No. 821,939. PATENTED MAY 29, 1906.
R. E. HARRIS.
WATER HEATER.
APPLICATION FILED APR. 12, 1905.
4 SHEETS—SHEET 1.
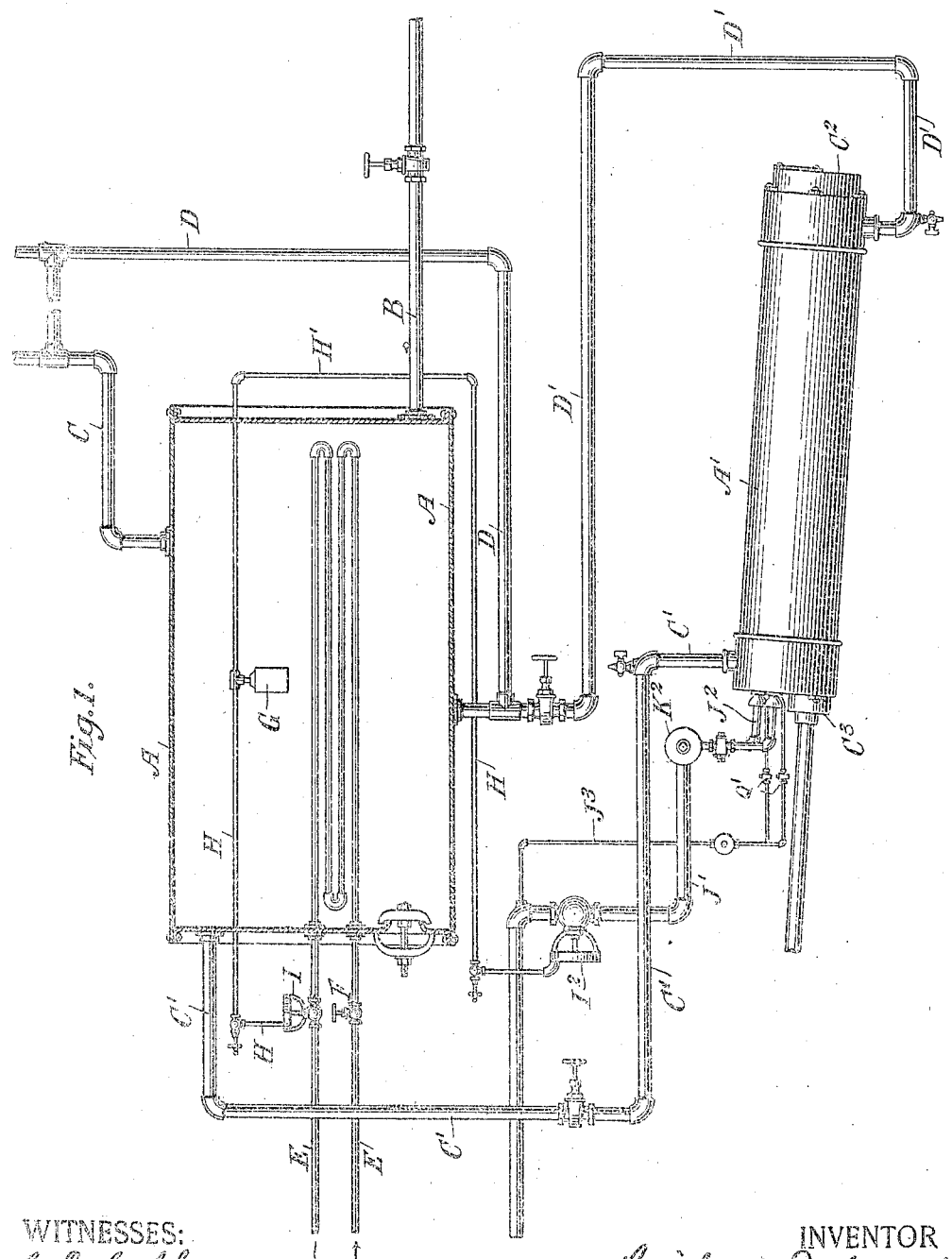

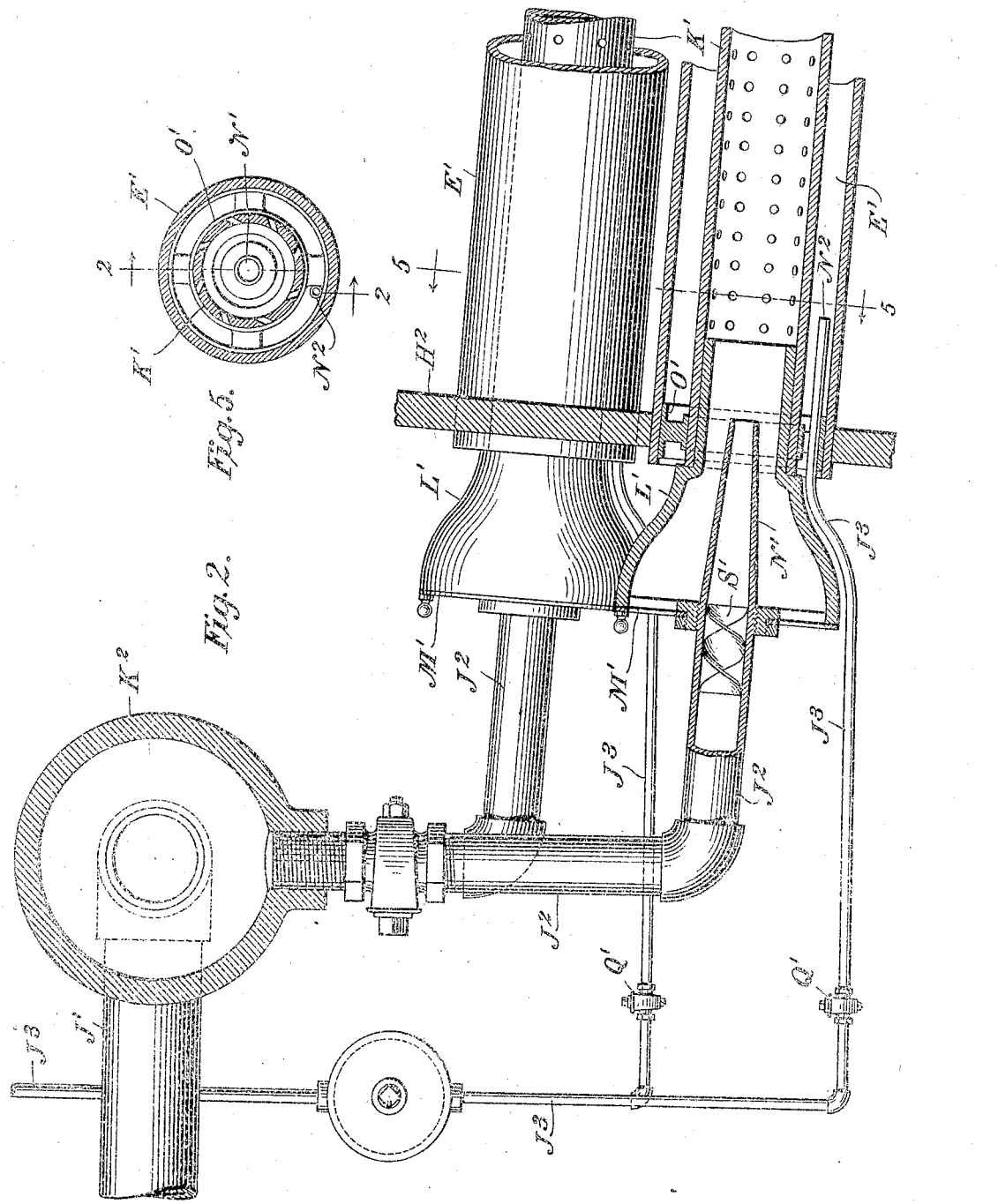

No. 821,939. PATENTED MAY 29, 1906.
R. E. HARRIS.
WATER HEATER.
APPLICATION FILED APR. 12, 1905.
4 SHEETS—SHEET 3.
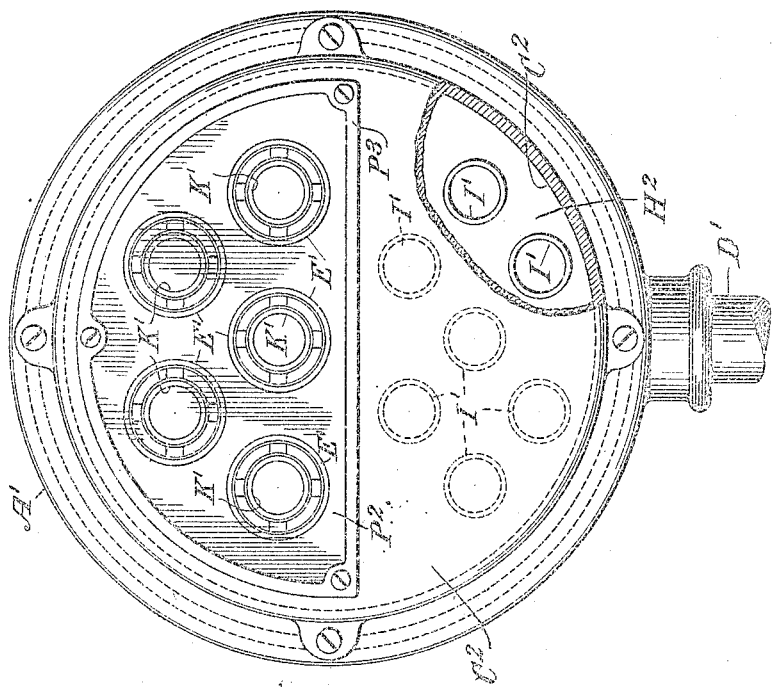
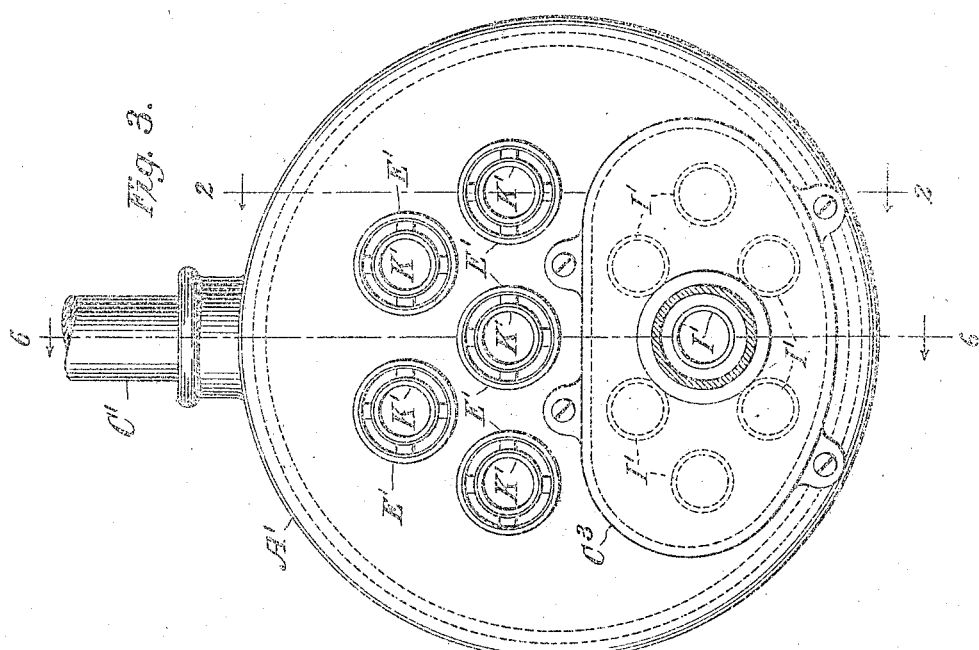
WITNESSES: INVENTOR

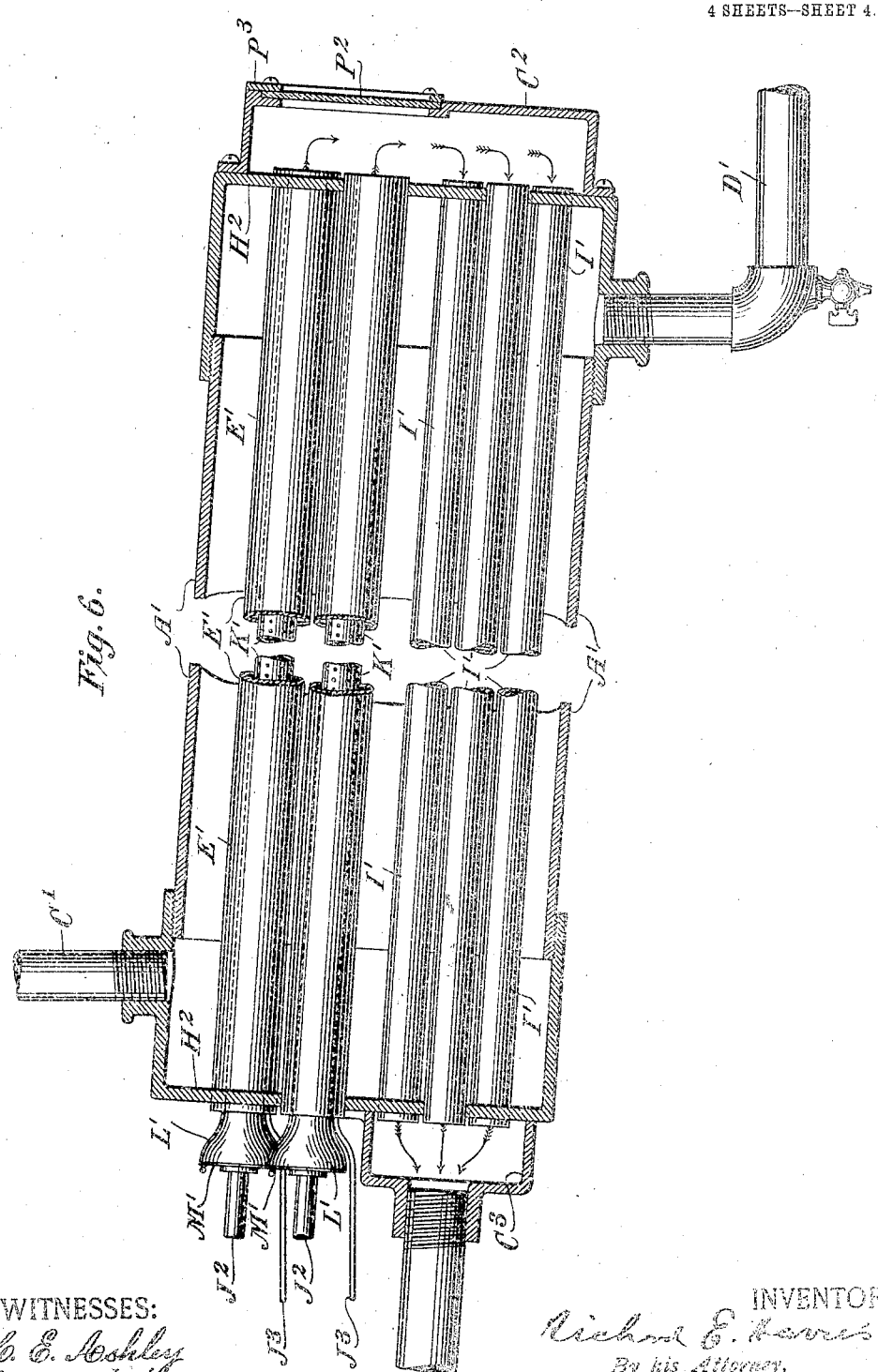

UNITED STATES PATENT OFFICE.

RICHARD E. HARRIS, OF NEW YORK, N. Y.

WATER-HEATER.

No. 821,939.　　　　　Specification of Letters Patent.　　　Patented May 29, 1906.

Application filed April 12, 1905. Serial No. 255,150.

*To all whom it may concern:*

Be it known that I, RICHARD E. HARRIS, a citizen of the United States, residing in New York, borough of Manhattan, county and State of New York, have made a new and useful Invention in Water-Heaters, of which the following is a specification.

My invention is directed particularly to improvements in means for heating water for buildings in which circulating water is heated by the passage of hot water or steam from a primary source of heat, as a range or a boiler, to and through a heating-chamber or boiler, usually located at some distance away from the primary source of heat, such apparatus being in well-known use in private houses, apartment-buildings, and the like.

It is a well-known fact that with heating apparatus of the type indicated in many instances during the heated term of the year the source of heat is cut off so that the rooms or apartments supplied with circulating water are without hot water.

My invention has for its objects, first, the provision of novel supplemental heating means combined with such apparatus, whereby with a limited amount of heat the entire supply of water may be heated sufficiently for general use throughout a building; second, the provision of novel means whereby, in the event of the failure of the primary source of heat, as a range or a boiler, such supplemental source may be immediately put into service until the primary source is in condition for use; third, the provision of means whereby such supplemental source of heat may be automatically actuated by the temperature of the water in the main heating-chamber and maintain the heated water therein at a definite temperature; fourth, the provision of a novel water-heating system adapted to heat water for use in buildings, in which system the source of heat is an inflammable gas and the heating means is in the nature of one or more perforated tubular burners sustained inside of a heating tube or tubes in a heating-chamber and combined with one or more additional tubes sustained in the same heating-chamber and adapted to carry off the products of combustion, the relation being such that a maximum heating effect is obtained with a minimum amount of combustible gas.

For a full and clear understanding of my invention, such as will enable others skilled in the art to construct and use the same, reference is had to the accompanying drawings, in which—

Figure 1 is a side elevational view of a water-heating system embodying my improvement, the main heating-chamber being shown in sectional view. Fig. 2 is an enlarged side elevational view of the essential structural parts of the supplementary heating-chamber and heating attachments, parts thereof being illustrated in sectional view for the purpose of showing more clearly the interior structure thereof, the sectional parts of the supplemental heating-chamber proper being taken on the lines 2 2, as illustrated in Figs. 3 and 5 of the drawings. Figs. 3 and 4 are end elevational views of the supplemental heating-chamber as seen looking at the same from the opposite ends thereof. Fig. 5 is a sectional view taken through the lower right-hand part of Fig. 2 on the line 5 5 and as seen looking thereat from right to left in the direction of the arrows. Fig. 6 is a sectional view taken through the supplemental heating device on the lines 6 6, Fig. 3, and as seen looking thereat from right to left in the direction of the arrows.

Referring now to the drawings in detail, in all of which like letters of reference represent like parts wherever used, A represents a main heating chamber or boiler, and B an inlet-pipe connected with the source of cold-water supply, C being a service-pipe at the top of the chamber running to the points of usage through the building, and D is a return or circulating pipe running to the bottom of the heating-chamber.

E represents a pipe running to and from a main source of heat, such as a range or a steam-boiler, usually located in the basement or engine-room of the building and disposed in the manner shown in the body of the heating-chamber, the function of said pipe being to convey from the range or boiler a supply of heat, either in the nature of hot water or steam, for the purpose of heating the water in the heating-chamber.

G is a thermostat located in the body of the heating-chamber and operatively connected with a thermostatic pipe H running to a diaphragm connected through a well-known form of means for automatically actuating the cock I, so as to cut off the supply of steam or water in the pipe E when the water in the chamber A reaches the proper temperature, the arrangement being such that when the water enters the heating-chamber A from the inlet-pipe B it is heated through the agency of the hot water or steam in the pipe E and caused to ascend through the service-pipe C to all parts of the building where it is to be used, the unused water ultimately returning as it becomes cooled through the circulating or return pipe D.

The apparatus so far described is well known and largely in public use throughout the United States. My improvement consists in supplying a supplemental heating-chamber of relatively much smaller capacity than the main heating-chamber and providing additional means whereby the necessary amount of water may be heated and passed through the main heating-chamber during the summer months or when the main source of heating energy is out of repair or disconnected and in heating the water in this supplemental chamber through the agency of an independent source of heat—such, for instance, as illuminating-gas—which is usually found in buildings of the character indicated. It consists also in providing means whereby the heat of the water in the main heating-chamber, as supplied from such supplemental heating-chamber, may be maintained at a relatively constant temperature.

A' represents the supplemental heating-chamber, which is located below the main heating-chamber A and is set when in position on an incline, as shown.

D' represents the inlet-pipe for the cold-water supply, connected directly to the pipe D and to the lower end of the supplemental heating-chamber A'.

C' represents the outlet-pipe, connected at the upper end of the supplemental heating-chamber directly to one end of the heating-chamber A.

E' E' E' represent a series of heating-tubes in the chamber A', similar in their heating effect to the corresponding heating-tubes E, running to the main source of heat. The construction of these tubes is clearly illustrated in the drawings, in which it will be seen their opposite ends are supported directly by the heads H² H² of the supplemental heating-chamber A'.

O' O' are double cast-metal rings connected together by radially-disposed arms, as shown in Fig. 5, and located within the ends of the heating-tubes, each pair of rings sustaining one end of a perforated tubular burner K', having the perforations disposed as shown in Fig. 5.

L' L' L' are detachable inlets for the supply of gas to the burners K', said inlets being provided with ventilating-dampers M' and means shown as knobs or handles for operating the same and also provided with means for axially sustaining gas-burner nozzles N', connected directly to a main gas-pipe J' through a cross-connecting pipe K² and through a series of branch pipes J² J², S' S' being spirally-disposed mixing devices located one at the entrance of each nozzle for thoroughly mixing the gases before they enter the burners.

I' I' I' (see Figs. 3, 4, and 6) represent a series of outlet pipes or tubes located below the heating-tubes and supported in the same manner as were the pipes E' E' directly by the heads H² H² of the supplemental heating-chamber A'.

C² represents an independent cylindrical chamber (see Figs. 1, 3, 4, and 6) which is secured directly to the end of the supplemental heating-chamber A', a portion of the outer face of said chamber being cut away and provided with a strong glass or other transparent part (indicated by the letter P²) and secured to the chamber by a metal rim P³ and screws, as shown, the function of said glass part being to permit of the inspection of the interior parts of the structure. This feature, however, constitutes no part of the present invention, the same being well known and in general use in connection with tubular heaters of the drum type. C³ is an additional chamber somewhat similar to the chamber C² and is secured directly to the other end of the supplemental heating-chamber A' in such manner as to surround the outleading ends of the pipes I' I', it being readily apparent on inspection of Fig. 6 of the drawings that the chamber C² covers or surrounds the ends of all of the pipes E' E' and burners K' K' at the corresponding end of the supplemental heating-chamber. The chamber C³ is connected by an outlet-pipe running to a flue or chimney or other point outside the building having sufficient draft capacity to insure the movement of the products of combustion from the burners to the outside of the building from the chamber where the gas is ignited, there being sufficient space around the burners where the supply of oxygen is admitted to insure this result.

J³ J³ J³ represent a series of supplemental gas-pipes connected with the main gas-pipe J' and each connected in turn to a pilot or lighting burner N², located below its corresponding heating-burner K', said lighting-burners being constantly supplied with a small quantity of gas when the cocks Q' are open.

H², Fig. 1, is a thermostatic pipe connected directly to the thermostat G and to a diaphragm operatively connected with the cock I² and adapted to cut off the supply of gas from the main gas-pipe J' when the temperature of the water in the main heating-chamber A has reached the desired point.

The operation is as follows: The main supply of heat being cut off by a cock F in the pipe E and the cocks which supply the gas and the water for the burners and supplemental heating-chamber A' having been turned in the proper direction, the gas flowing through the nozzles N' is ignited at the perforations throughout the entire lengths of the tubular burners K' by the jets from the pilot or lighting burners N², and the products of combustion pass downward through the pipes E' E' into the chamber C², again downward and into the lower ends of the outlet-pipes I' in the direction of the arrows, thus causing said outlet-pipes to additionally heat the water in the supplemental heating-chamber, said products of combustion finally emerging into the chamber C³ at the other end of the supplemental heating-chamber, as shown, and passing outward by a pipe to the chimney or some point exterior to the building. The regulation of the inflow of air to the burners will be effected at the pleasure of the user by the damper M', the action of the spirally-disposed mixing devices S', giving to the inflowing gas a spiral movement, and thereby effecting a thorough mixture of the gases with the air before they enter the tubular burners K'. Consequently the water is heated in the supplemental heating-chamber A' and passes upward by reason of the inclined location of such chamber through the outlet-pipe C' into the main heating-chamber A, and when the supply therein is sufficiently heated the thermostatic device G automatically turns the cock I² and cuts off the supply of gas in the pipe J', thus extinguishing the gas in the nozzles N'. The water circulates in the usual manner through the building by the pipe C and as it cools returns through the return-pipes D and D'. When finally the temperature in the main chamber A falls to a point beyond the predetermined temperature, the thermostatic device G again opens the gas-cock 12 in the pipe J' and allows the jets of the pilot or lighting burners N² to ignite the gas at the tubular burners K', and so this action continues indefinitely.

I do not limit my invention to the especial details of construction shown, as obviously it might be materially departed from and still come within the scope of my claims hereinafter made. To illustrate, I do not limit myself to the generation of heat in the heating chamber A' through the agency of illuminating-gas, and I desire it understood that my claims are of such scope as to include any heating agency which may be automatically combined with a supplemental heating-chamber in the manner described and so as to heat limited volumes of water and supply the same to a heating-chamber adapted to be utilized in the well-known way.

By the term "supplemental heating-chamber" I wish to be understood as meaning an additional heating-chamber adapted to heat water in relatively smaller quantities than could be heated in a main heating-chamber and so disposed with relation to said main heating-chamber that the required amount of heat for heating water for a building may be effected with a minimum utilization of energy.

Having thus described my invention, what I claim, and desire to secure by Letters Patent of the United States, is—

1. A water-heating system embracing a heating-chamber and one or more heating-tubes located therein; in combination with one or more perforated tubular burners located inside said heating-tubes; together with one or more outlet pipes or tubes located also in the heating-chamber and connected to the heating-tubes through an independent chamber at one end of said heating-chamber, and to an additional chamber at the other end thereof and having a common outlet-pipe, substantially as described.

2. A water-heating system embracing a heating-chamber; a series of heating-tubes located therein, and a series of perforated tubular burners located one in each heating-tube; in combination with a second series of tubes located also in the heating-chamber and connected through a common interconnecting chamber to the first-named tubes in such manner as to convey the products of combustion to a common outlet surrounding the outlet ends of all of the second series of tubes; together with a nozzle for each burner and a supplemental or pilot burner for each nozzle, substantially as described.

3. A water-heating system embracing a heating-chamber provided with heating-tubes sustained in the heads thereof and inclosing each a perforated tubular burner similarly sustained at each end; in combination with a series of outlet-tubes for the products of combustion sustained also by the heads of the heating-chamber, all being interconnected through an independent chamber at one end and the outlet-tubes connected to a common outlet-chamber at the outlet end and to an outlet-tube extending to a point outside a building, substantially as described.

4. A water-heating system embracing a heating-chamber and an outlet and inlet pipe therefor; in combination with a series of heating-tubes sustained by the heads of the chamber; perforated tubular burners, one for each heating-tube located inside the same and similarly sustained at their opposite ends; together with a gas burner or nozzle for each perforated burner and a series of outlet pipes or tubes sustained also by the heads of a chamber, the outlet ends of the heating-tubes and the inlet ends of the outlet pipes or tubes being surrounded by an additional chamber; while the opposite ends of said outlet-tubes are connected to a common chamber which in turn is connected to an outlet-tube for carrying away the products of combustion, substantially as described.

5. A water-heating system embracing a heating-chamber and a series of heating-tubes located therein and having their inlet ends connected to a common outlet-pipe; a series of perforated heating-burners located within said tubes; a series of gas-burner nozzles, one or each perforated burner; in combination with a ventilating or regulating damper for each nozzle, and a series of supplemental gas-pilot burners, one for each nozzle, substantially as described.

6. A water-heating system embracing a heating-chamber; a series of heating-tubes sustained therein and having their inlet ends connected to a common outlet-pipe; a series of concentric perforated burners, one for each heating-tube; a gas-burner nozzle and a damper or draft-regulator for each nozzle; in combination with a pilot-burner for each nozzle, said pilot-burners being located between the surface of the heating-tubes and the outer surface of the perforated burners, substantially as described.

7. A water-heating system embracing a main heating-chamber and means within said chamber connected to a source of heat-supply for heating the water therein; in combination with a supplemental heating-chamber having one or more heating-pipes secured therein and one or more perforated tubular burners located inside of said heating-pipes; together with one or more outlet pipes or tubes located also in the supplemental heating-chamber and connected to the heating-tubes thereof at one end and to a common outlet-pipe, substantially as described.

8. A water-heating system embracing a main heating-chamber provided with means located therein operatively connected with a source of heat-supply for heating the water; in combination with a supplemental heating-chamber embracing a series of heating-tubes secured therein and each provided with a perforated tubular burner operatively connected with an independent source of heat-supply; together with a series of outlet pipes or tubes located also in said supplemental heating-chamber and additional chambers at each end of the supplemental chamber for conveying the products of combustion to the exterior air; together with interconnecting pipes for conveying the water from the supplemental heating-chamber to and through the main heating-chamber, substantially as described.

9. A water-heating system embracing a main heating-chamber provided with means located therein and operatively connected to an external source of heat for heating the water; a supplemental heating-chamber provided with a series of heating-tubes secured therein and surrounding each a perforated tubular burner operatively connected with an independent source of heat-supply; additional pipes or tubes located in said supplemental heating-chamber and additional chambers at the opposite ends of said supplemental chamber for conveying the products of combustion in two directions through said chamber and to the exterior air; together with interconnecting water-conveying pipes between the main and the supplemental heating-chamber, and a thermostatic heat-regulating device located in the main heating-chamber and operatively connected with means for cutting off the supply of heat both to the main heating-chamber and the supplemental chamber, substantially as described.

10. A water-heating system embracing a heating-chamber and two series of heating-tubes located therein, one end of one of the series communicating with the open air and surrounding the nozzles of burners; one end of the other series being connected with an outlet-pipe extending to a flue or chimney, the remaining ends of both series being connected to an intercommunicating chamber, said heating-chamber being provided with a water-inlet and a water-outlet pipe, substantially as described.

In testimony whereof I have signed my name to this specification in the presence of two subscribing witnesses.

RICHARD E. HARRIS.

Witnesses:
C. J. KINTNER,
F. ZAVATSKY.